Patented Mar. 8, 1927.

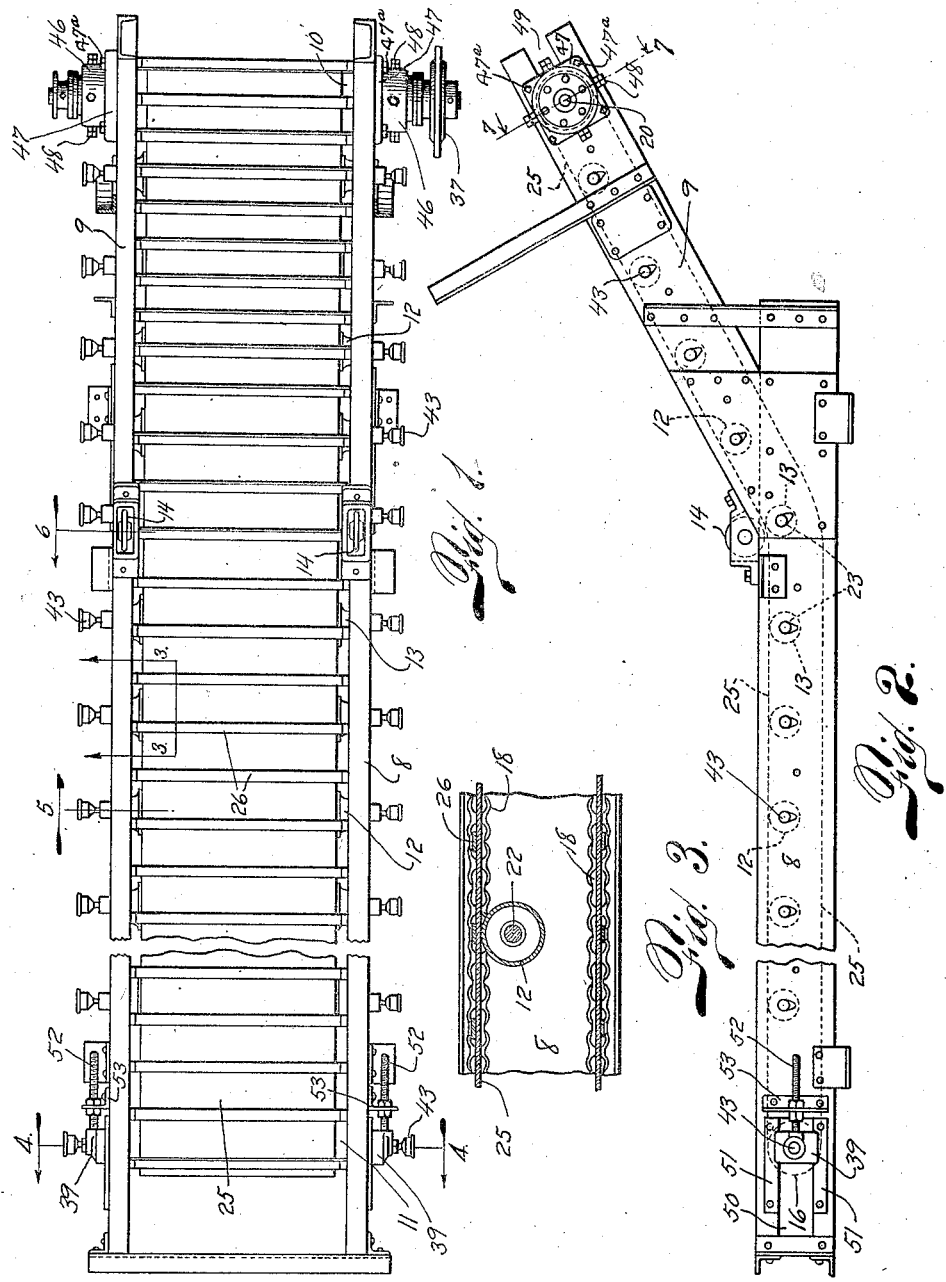

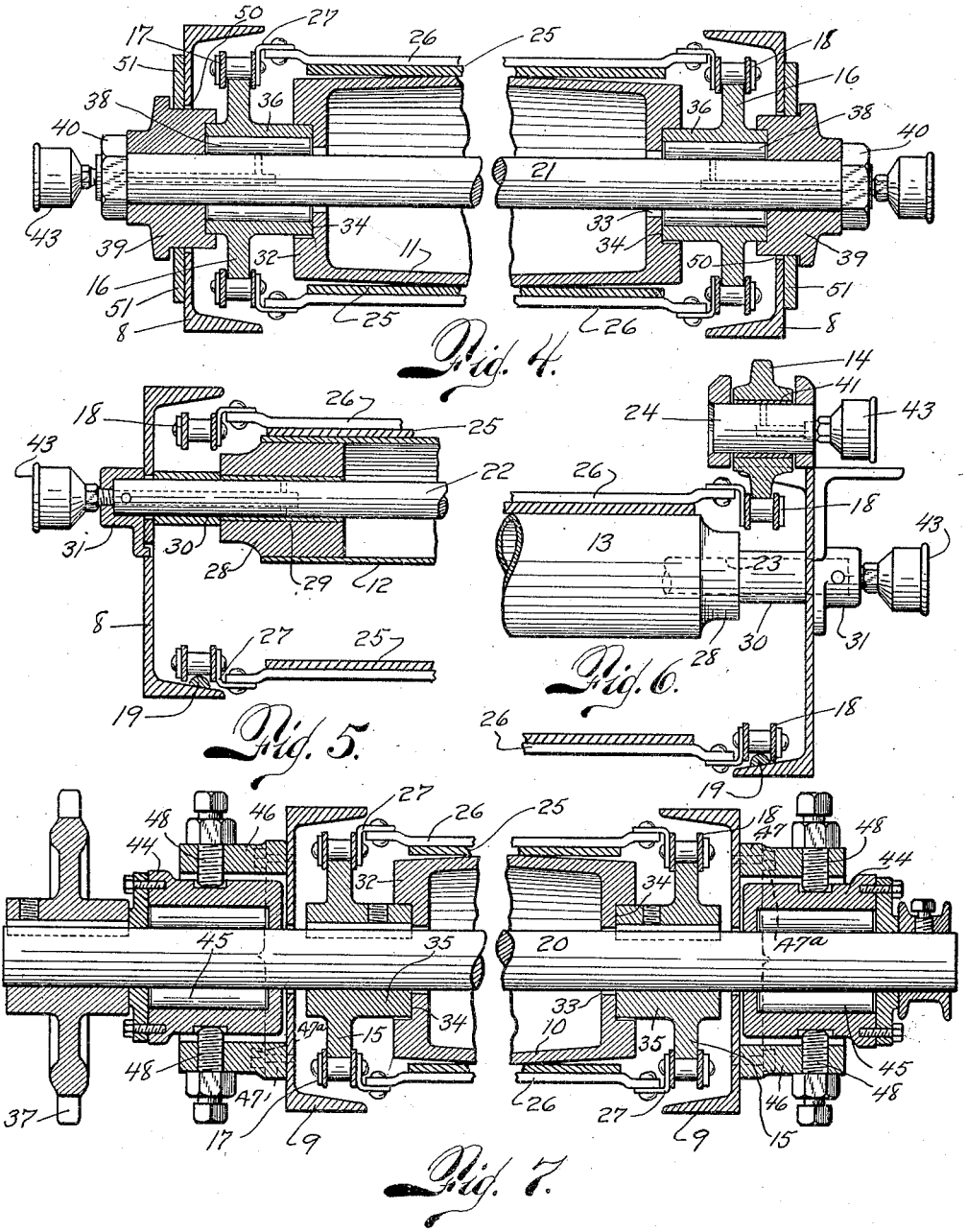

1,620,168

UNITED STATES PATENT OFFICE.

JAMES W. SILVER, OF OGDEN, UTAH.

ENDLESS-BELT CONVEYER.

Application filed October 6, 1925. Serial No. 60,823.

This invention relates to improvements in endless belt conveyers, and the improvements broadly reside in an assembly embodying an endless belt which is not only supported intermediately of its side edge faces by a suitable series of elongated pulleys or cross rollers, mounting the same in endless traveling relation, but which is additionally supported, in such relation, by suitable means embodying side sprocket chains and sprocket wheels, or their equivalent, in a novel manner and for purposes hereinafter appearing.

For simplicity of disclosure, I shall illustrate and describe the improvements with more particular reference to an initial or feeder conveyer, for which the invention has been more especially devised, adapted to be disposed between a receiving hopper, for sugar beets as hauled from the field, and the main inclined elevating conveyer of a beet dump.

To this end, therefore, the improvements are illustrated as embodying what I term a tail section and a head section, the head section being disposed at an upwardly inclined obtuse angle to the tail section, while the latter is ordinarily adapted to be disposed horizontally or parallel with the ground, and is preferably contained within a relatively shallow pit, over which the beet receiving hopper is located.

It is to be understood, however, that the invention is not necessarily limited to a belt conveyer assembly having angularly disposed sections, and I wish also to emphasize at the outset that the structural features of the improvements are not to be restricted to any one particular sphere of usefulness, as the same may be employed in various relations, other than as a feeder conveyer, or wherever belt conveyers generally are adapted for use.

It has heretofore been a custom to employ pan conveyers and even belt conveyers, without sprocket chain supporting means, in connection with beet dump apparatus, but pan conveyers have many disadvantageous features, including the fact that they cause the beets to become more or less bruised, while ordinary belt conveyers are also somewhat objectionable for various reasons, including a tendency towards sagging and uneven feed, as well as a tendency to slip around their end supporting rollers, under variations of load, and furthermore they are not so well adapted for properly conveying beets and accompanying refuse matter from a lower to a higher level, especially if there be a bend or curve in the conveying line.

One of the objects of my invention, therefore, although there are various others hereinafter appearing, has been to devise a belt conveyer assembly of the character referred to, as a substantial improvement over pan conveyers and belt conveyers especially as heretofore employed with beet dumps, wherein the center line of the belt and the center lines of its supporting side sprocket chains are identical or are disposed in the same lateral plane, thus enabling the belt and chains to be positively driven and to travel freely and smoothly over the rollers and sprocket wheels, regardless of whether or not there be a bend or curve in the conveying line, and regardless of the load or its variations.

The foregoing and other objects and advantages, however, will be so clearly apparent it is believed, as incidental to the following disclosure, that it would serve no useful purpose to further enlarge upon the same initially, and with the foregoing general remarks, therefore, reference will now be immediately had to the accompanying drawings, illustrating a practical embodiment of the improvements, in which drawings—

Figure 1 is a plan view of my improvements as applied to an initial or feeder conveyer having a bend or curve in the conveying line; Figure 2 is a side elevational view of the same, the driving wheel for the head shaft being omitted; Figure 3 is a detail fragmentary sectional view on the line 3—3 of Figure 1; Figure 4 is a transverse sectional view, broken away centrally, taken along the line 4—4 of Figure 1, or longitudinally of the end tail supporting roller and its associated parts; Figure 5 is a fragmentary sectional view, taken on the line 5 of Figure 1, through one of the idler rollers for supporting the belt intermediately of the end supporting rollers; Figure 6 is a fragmentary sectional view, taken on the line 6 of Figure 1, through the idler roller and associated parts located at the position where the bend or curve is made in the conveying line; and Figure 7 is a transverse sectional view, broken away centrally, taken along the line 7—7 of Figure 2, or longitudinally of the end head supporting roller and its associated parts, and with the sprocket driving wheel for the head shaft included.

The numeral 8 designates a horizontal section and the numeral 9 an inclined section, preferably formed of structural steel beams with their channels facing inwardly in opposed relation, embodying an open framework for a feeder type of conveyer as referred to. Suitably journaled thereon, in transverse disposition, are what I term the end head pulley roller 10, which is a driving roller for the belt and sprocket chain, the end tail pulley roller 11, which is adjustably mounted in take-up bearings, and idler belt supporting rollers 12 and 13, which intermediate rollers 13 may be conveniently termed up-guiding rollers and are preferably arranged as a pair at positions with one located at each side of where the conveying line makes a bend or turn, as seen more clearly from Figure 2, although only one of these guiding rollers might be used immediately at the position of bend in the conveying line.

At any event a pair of sprocket chain up-guiding idler wheels 14, whether toothed as sprocket wheels or otherwise, are journaled by stub shafts 24 above said up-guiding rollers 13, see Figures 1, 2 and 6, at positions either directly over the end portions of the shaft 23 of one of them, or between the same as before stated. The underneath peripheral portions of each of said idler wheels 14 are disposed in line with the upper peripheral portions of paired head sprocket wheels 15 and paired tail sprocket wheels 16 mounted on and towards the ends of the shafts 20 and 21, respectively, for the end head and end tail pulley rollers 10 and 11. The sprocket wheels 15 and 16 are housed within the channels of the framework beams, and side sprocket chains 17 and 18 reeve over said sprocket wheels 15 and 16 and under said idler wheels 14, the latter in up-guiding relation. These chains may preferably be of the roller bearing type, and on their return or non-conveying direction of travel, to prevent any sagging thereof, they may ride along half-round tracks 19 extending longitudinally of the inside face of the lower webs of the channel beams.

The numeral 25 designates the endless conveyer belt proper, which is preferably made of a suitable rubber fabric or analogous composition, and the belt not only reeves around the head and tail pulley rollers 10 and 11, as rotary end supports therefor, the lower surface of the upper portion thereof riding over said idler and guiding rollers 12 and 13, but it is also additionally supported along its entire length by transverse slats or bars 26 securely attached to its outer surface and at their own ends suitably connected to said sprocket chains, preferably at positions equidistantly spaced apart.

These cross bars or slats 26 are preferably made of spring steel, and may be secured at their ends to the side sprocket chains, 17 and 18, as by means of angle plates or suspension brackets 27, riveted at one end to their respective slats 26 and at their other end pivotally connected to a complementary axis pin connecting a pair of the links of the side sprocket chains, the connection being such that the belt is thereby held in a position so that it lies in a lateral plane extending through the center lines of said sprocket chains.

All of the rollers 10, 11, 12 and 13 may be hollow, the idler and guiding rollers 12 and 13 being shown as open-ended tubes having plugged heads 28 axially bored and journaled on the steel shafts 22—23, respectively, over babbitted bushings or bearing sleeves 29, with end spacing sleeves 30 interposed, if desired, to hold the rollers properly aligned, and the shafts themselves may be held in position by the retaining caps 31.

The head and tail pulley rollers 10 and 11, while hollow, are preferably formed somewhat of barrel-like shape, with their heads 32 axially apertured, as at 33, for the free passage of the head and tail shafts 20 and 21, respectively, the head shaft 20 being the drive shaft for the sprocket wheels, and the heads of said rollers are also annularly recessed, as at 34, for seating with a free or loose fit over the inner ends of the hubs 35 and 36, respectively, of the head and tail sprocket wheels 15 and 16, as their bearing support, thus allowing for a limited play or differential movement of the head and tail pulley rollers relatively to their complementary sprocket wheels.

The head sprocket wheels 15, however, are the positive driving means for the sprocket chains, which in turn positively drive the conveyer belt proper, and the said sprocket wheels 15 are accordingly keyed to the head or driving shaft 20, as is also a driving sprocket wheel 37 therefor, or its equivalent, whereas the tail sprocket wheels 16 are freely or rotatably mounted, relatively to their adjustably fixed or non-rotatable tail shaft 21, on interposed roller bearings 38. Annularly recessed and slidingly adjustable retaining head blocks 39 fit snugly but freely over the outer ends of the hubs 36 of the sprocket wheels 16, and the said adjustable retaining head blocks 39 and tail shaft 21 are fixedly held in assembled relation by the shaft, functioning as a tie-rod, with nuts 40 threaded on the ends thereof. The manner of adjustably mounting the said retaining head blocks will later be described.

The stub shafts 24, for the chain up-guiding wheels 14, may also be non-rotatable shafts with babbitted bushings or bearing sleeves 41 encompassing the same, and lubrication of these bearings, as well as of the bearings for the tail shaft 21 and of the idler and guiding roller shafts 22—23, may well be provided for by drilling out the ends of the respective shafts to form portways, shown in dotted lines, to which are fitted grease cups 43, or their equivalent.

The head or driving shaft 20 is journaled in roller bearing boxes 44, provided with bearing rollers 45 encompassing the outer end portions of the shaft, the boxes 44 being contained within larger casings or collars 46, bolted to the upper outer faces of the frame beams 9, as by means of the integral flange portion 47 and the bolts 47ª, and the said boxes 44 themselves being adjustably mounted within said casings or collars 46 by means of a plurality of radially disposed supporting set screws 48, four being shown in the drawings, which provide for the radial adjustment of said boxes and alignment of said driving shaft 20. The upper ends of the frame beams 9 are formed with longitudinal end-opening slots 49, for the insertion, adjustment and withdrawal of the driving shaft 20 and its associated parts as a unit, when and if desired.

The ends of the tail beams 8 are likewise provided with end-opening side slots 50, which may be faced with wear plates 51. Within the slots 50 are slidingly mounted the retaining head blocks 39, for the tail shaft 21, which retaining blocks 39 slidingly mount or provide for take-up bearings for said tail shaft 21. The means for adjusting and holding the retaining head blocks 39, although any suitable means could be employed, may simply consist of a pair of nut controlled bolt rods 52, each secured at its inner end to a complementary one of the head blocks 39, and at their projecting ends extending through angle plates or abutments 53, carried by the outside faces of the tail beams 8, controlling nuts being threaded on each of said bolt rods 52, with one nut on each side of its complementary abutment 53, as seen at Figures 1 and 2.

In operation and when power is appropriately applied to the head or drive shaft 20, as by means of the sprocket wheel 37 or its equivalent, the upper portions of the sprocket chains 17—18 and conveyer belt 25 are caused to travel forwardly by the positive actuation of the driving sprocket wheels 15 and the transverse spring slats 26, so attached to the conveyer belt and carried by the sprocket chains as to cause the former to lie in the plane of the center lines of the latter. In this forward travel, when an inclined section 9 is employed, as is the case when the improvements are used as a feeder conveyer for beet dumps, the transversely spaced upguiding wheels 14 alone engage the traveling conveyer from the upper side. That is to say, the wheels 14 bear down upon the upper surfaces of the upper portions of the sprocket chains 17—18, holding the lower surface of the upper portion of the conveyer belt 25 down against the up-guiding rollers 13, so that the conveyer belt smoothly makes the bend with entire clearance and free from any obstruction to the passage, up the incline, of all material that may be on the conveyer belt.

The use of the spring steel bars or slats 26, which support the conveyer belt from the sprocket chains in the manner hereinbefore set forth, provide for a certain desired degree of give or flexibility to compensate for any sudden load imposed upon the conveyer belt between its supporting rollers. These spring steel bars also act as cleats on the belt to prevent the beets from rolling back when traveling up the incline, while also giving a better gripping action under the beet load, and they also make it possible for the conveyer belt to carry the dirt and refuse along with the beets up the incline, it being understood that, with beet dumps, it is essential that the dirt, leaves and other refuse, of a load of the beets from the field, be separated from the beets proper, after initial weighing of the wagon and entire load, and the screened out refuse returned to the wagon for re-weighing and computation of the tare to be deducted.

With the conveyer belt lying in a lateral plane passing through the center lines of the sprocket chains, as has before been emphasized, this will enable the belt and chains to pass smoothly over the head and tail pulley rollers and sprocket wheels. I have hereinbefore set forth the differential mounting of the head and tail pulley rollers relatively to their sprocket wheels, insuring an even pull and wear on both sprocket chains, and have likewise fully disclosed the manner of adjustably mounting the head and tail shafts carrying said pulley rollers and sprocket wheels.

As has before been stated, the use of a rubber fabric belt is more desirable than a pan type of conveyer, because it does not bruise the beets as is the case with a steel carrier, but if the conveyer belt were used alone, the pulley rollers would not establish sufficient friction thereon to drive the same under the ordinary load without continual slipping. The combination belt conveyer with chain drive, however, provides for a very satisfactory solution, the conveyer belt being supported entirely along its length by the cross slats and being positively driven by the sprocket chains, and the whole arrangement permits of the use of a very shallow feeder conveyer.

From all of the foregoing, it is believed that the full objects and advantages of the invention will be clearly apparent, but although I have illustrated and described the improvements in detail, in accordance with my present preferences, it will nevertheless be understood that I do not wish to unnecessarily confine myself to all of said details exactly as disclosed, excepting as they may come within the terms or tenor of the claims, or equivalent elements and combinations thereof, or as fairly interpreted in the light of the specification if necessary.

What I do claim, as new and patentable, is:—

1. In endless conveyers, the combination of paired transversely spaced head and tail sprocket wheels, a head and a tail pulley roller respectively associated with and mounted for slight differential rotation relatively to the same, an endless conveyer belt reeving over said rollers, paired sprocket chains extending along the sides of said belt and reeving over a complementary pair of said sprocket wheels, and laterally projected bars connecting said belt with said side sprocket chains.

2. In endless conveyers, the combination of a head and a tail shaft, paired transversely spaced sprocket wheels mounted on said respective shafts, with one pair of said sprocket wheels fast on its shaft while the other pair is freely rotatable and each of said sprocket wheels having an inwardly projected hub, means for driving said shaft having the sprocket wheels fast thereon, a head and a tail pulley roller rotatably mounted on the hubs of a respective pair of said sprocket wheels, an endless conveyer belt reeving over said rollers, paired sprocket chains extending along the sides of said belt and reeving over a complementary pair of said sprocket wheels, and laterally projected bars connecting said belt with said side sprocket chains.

3. In endless conveyers, the combination or a framework support embodying transversely spaced longitudinal side beams, a pair of adjustably mounted journal boxes at the head end of said beams, a driving head shaft journaled in said boxes, a spaced pair of head sprocket wheels mounted fast on said shaft between said beams, a tail shaft at the other end of said beams, a spaced pair of tail sprocket wheels rotatably mounted on said tail shaft between said beams, all of said sprocket wheels having laterally projecting hubs, adjustably supported retaining heads mounting said tail shaft and annularly recessed to encompass a complementary hub of said tail sprocket wheels, a head and a tail pulley roller rotatably mounted on the hubs of a respective pair of said sprocket wheels, an endless conveyer belt reeving over said rollers, paired sprocket chains extending along the sides of said belt and reeving over a complementary pair of said sprocket wheels, and laterally projected bars connecting said belt with said side sprocket chains.

In testimony whereof, I affix my signature.

JAMES W. SILVER.